United States Patent Office 3,159,484
Patented Dec. 1, 1964

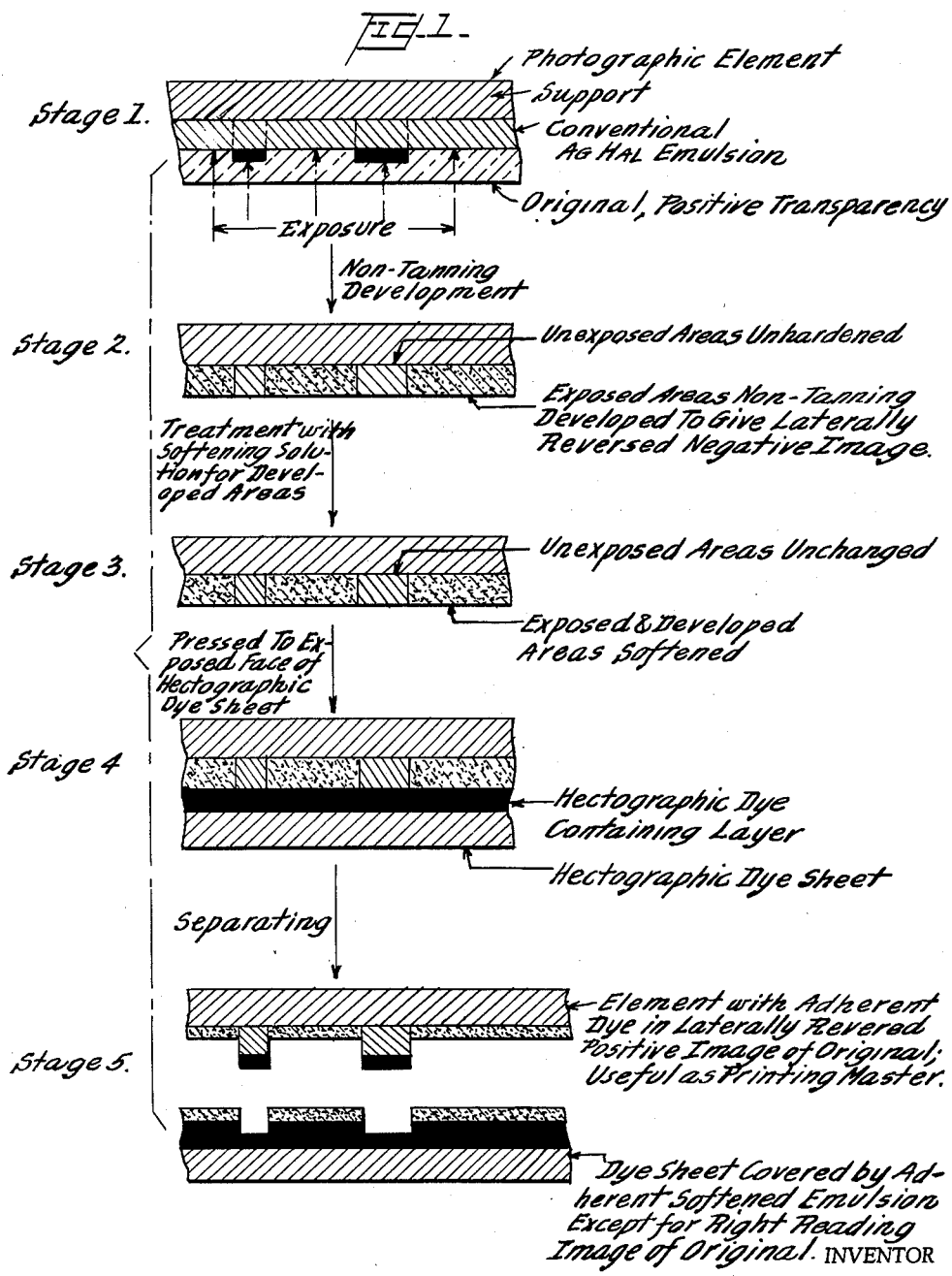

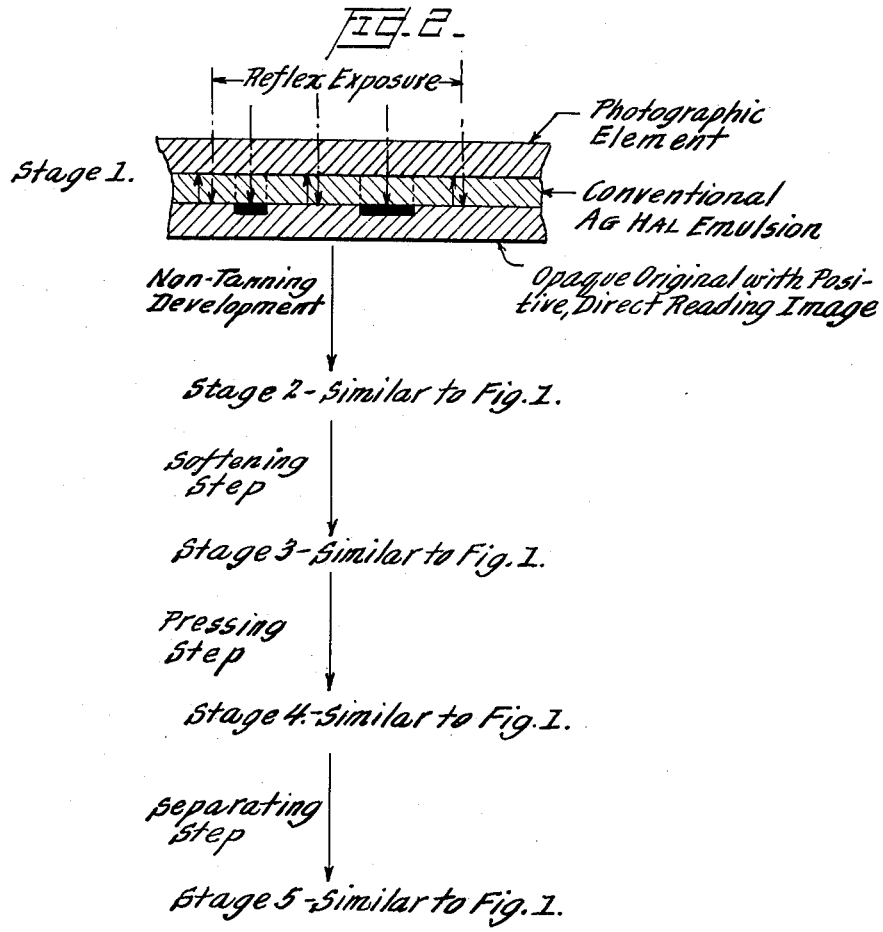

3,159,484
METHOD FOR PREPARING SPIRIT
DUPLICATING MASTERS
Albert Emiel Van Hoof, Berchem-Antwerp, Belgium,
assignor to Gevaert Photo-Producten N.V., Mortsel,
Belgium, a Belgian company
Filed Dec. 2, 1960, Ser. No. 73,209
Claims priority, application Great Britain, Dec. 2, 1959,
41,019/59
7 Claims. (Cl. 96—28)

This invention relates to a new and improved photographic process for the preparation of spirit duplicating masters and is an improvement in, or modification of, the invention described and claimed in the co-pending application of Van Hoof and Holvoet for "Method for Preparing Spirit Duplicating Masters," filed October 31, 1960, Serial No. 66,083.

In the earlier application just identified, there was claimed a new method of preparing a printing master suitable for use in spirit duplicating processes according to which method a layer consisting of or containing a dyestuff is pressed against a gelatin silver halide emulsion layer in which a developed photographic image of the matter to be duplicated has been formed and which has been treated to have greater gelatin hardness in the regions or areas where the silver halide has been developed to a silver image, and the said layers are subsequently separated with simultaneous transfer from the emulsion layer to the surface of the dyestuff layer of the less hardened portions of the emulsion in the other areas of the emulsion layer. In other words, the two layers are brought into close face-to-face relationship to cause the less hardened regions of the developed emulsion layer to adhere to the face of the dyestuff layer so that upon subsequent separation of the two layers, the less hardened regions are detached from the emulsion layer and remained adhered to the dyestuff layer, overlying corresponding regions of the dyestuff layer.

Following separation of the layers in the previous method, the dye layer is seen to be exposed, i.e., free of overlying emulsion, only in those areas corresponding to the more hardened regions of the emulsion layer which has been developed to a silver image and the selectively covered dye layer thus obtained may be used as a duplicating master. In the duplicating process, the regions of the dyestuff layer carrying the overlying emulsion will be effectively masked or blocked and cannot transfer an image to the duplicating sheet whereas the remaining uncovered regions are free to do so. The dye layer must, of course, be of such composition that the dyestuff is capable of being transferred to print paper when the latter is contacted with the master in the presence of a suitable liquid, e.g., a liquid of the type usually employed for spirit duplicating and consisting mainly or essentially of one or more aliphatic alcohols. By way of example, very suitable materials are the commercially available duplicating carbon papers of the type generally used in the preparation of spirit duplicating masters by mechanical means (e.g., by typewriting). It will be understood that the carbon paper employed must be free of a hydrophobic protective layer, e.g., a wax layer, covering the dyestuff layer. Such carbon papers are well known in the art as is the technique by which they are used in duplication and further description here is unnecessary.

In the normal practice of the method according to the above-mentioned application at least some of the dyestuff is likewise transferred from the dye layer onto the silver halide emulsion layer in those areas where the silver halide has been developed to a silver image so that after separation of the layers the photographic material may itself be used as a duplicating master. In other words, transfer from one layer to the other as a result of contact and separation does not necessarily take place in one direction only but may, and indeed normally does, take place in both directions, the more hardened regions of the silver halide emulsion (previously developed to a silver image) acquiring a superimposed coating of dyestuff from the dye layer and the regions of the dyestuff layer corresponding to the less hardened regions of the emulsion layer acquiring a superimposed coating of less hardened emulsion. As both layers after separation carry exposed dyestuff in a selective pattern according to the original to be copied, one being the laterally reversed pattern of the other, either may be used for purposes of duplication.

According to the earlier application, the photographic image of the original to be duplicated is formed by means of a tanning development following photographic exposure of the silver halide emulsion layer to the original, which development has the effect of hardening those regions of the emulsion layer converted to a silver image.

The principal utility of the invention of the earlier application was, of course, in the copying of documents which in the normal course of events often exist or occur in the original as a positive rather than a negative. It was found that use of that invention in actual practice for the production of positive copies from positive originals required that the photographic material providing the silver halide emulsion layer be of the so-called direct positive variety, i.e., an emulsion which on exposure and development gives a positive image (which, however, may be laterally reversed, depending on the method of exposure adopted). Direct positive emulsion photographic materials fall into a rather special category, are frequently more expensive than the common negative materials, and may not be always available to one seeking to practice the invention. Consequently, the practical limitation of the earlier invention to direct positive photographic materials constituted an obvious disadvantage. It has now been found that a light-sensitive photographic material comprising a gelatin silver halide emulsion can also be made into a printing master by a method which comprises photographically exposing the emulsion layer to an original to be duplicated, treating the photographic material so that the emulsion layer bears a developed photographic image of the original and exhibits lesser gelatin hardness in the areas where the silver halide has been developed to a silver image, pressing a layer consisting of or containing a dyestuff against the said emulsion layer, and subsequently separating the layers with simultaneous transfer to the dye layer from the emulsion layer of emulsion in the areas of lesser hardness where the silver halide has been developed to a silver image.

The present invention, therefore, contemplates a method of producing a printing master similar to that of the earlier application with the important differences that the emulsion layer bearing the developed photographic image exhibits lesser gelatin hardness in the areas where the silver halide has been developed to a silver image and the transfer of emulsion to the dyestuff layer takes place in or from the said silver image areas. As a consequence of these differences, it is possible to employ as the silver halide emulsion layer a photographic material of the conventional negative variety so that positive copies or duplicates of a positive original may be obtained as a matter of course in the normal practice of the method.

For a more complete understanding of the details of the invention and certain of the manipulative procedures employed therein, reference may be had to accompanying drawings, in which:

FIG. 1 is an illustrative embodiment of the present method carried out with a negative transparency using exposure through the transparency and showing the materials in several stages and the processing steps between those stages, all with appropriate captions; and FIG. 2 is a variation of the embodiment of FIG. 1 with an opaque original using reflux exposure, the steps and stages similar to those of FIG. 1 being merely so designated and not illustrated in full.

It will be appreciated that FIGS. 1 and 2 are more or less idealized portrayals of the present invention, the thickness of the several layers and supports, for example, being considerably exaggerated for sake of clarity and by no means necessarily representing what actually occurs in practice. In these figures, the following convention has been adopted to depict the different conditions of the emulsion: Standard cross-hatching indicates the usual starting condition of the photographic emulsion; dashed hatching indicates emulsion material that has been softened, and added stippling indicates emulsion material that has been developed to contain silver metal grains.

In carrying out the present invention, the photographic material may be prepared for the contact with the dye layer by exposure to the original, development of the latent image by a non-tanning development and subsequent treatment of the photographic material with a suitable composition having the characteristic of softening the gelatin in the areas where the silver halide has been developed to a silver image. If the silver image comprises areas of different silver density, softening occurs to different degrees in such different areas. This follows incidentally from the nature of the photographic process and during the transfer step corresponding variations in the amount of emulsion transferred will take place to give, upon duplication, gradations in intensity of the duplicate image similar to those in the original.

As in the case of the earlier invention, the dye layer of the present invention is preferably that of a commercially available carbon paper as used in spirit duplicating processes. The photographic material preferably comprises a paper support for the light-sensitive emulsion. The nature of the supports or base materials for the respective layers has no significant bearing upon the invention and various base materials can be utilized as will be obvious to one skilled in the art.

For preparing a printing master according to the invention which will produce positive readable copies of an original text, the light-sensitive layer must be exposed to the original in such a way that upon development, a negative laterally reversed silver image of the original is obtained on said layer. This result may be achieved by reflectographically exposing the light-sensitive layer to the original. Other methods are available, however, for obtaining a laterally reversed silver image and are known to those skilled in the art of document reproduction. Moreover, it is to be understood that the invention is not limited to the preparation of masters for reproducing reading matter, and in some cases, e.g., in the reproduction of drawings, it is not always necessary for the master copy to be laterally reversed with respect to the original. Neither is the invention limited to the preparation of masters from positive originals or for producing positive duplicated copies, although this represents the preferred and most effective utilization of the principles here involved. In those instances where only a negative original is available and positive copies are desired, the invention can be practiced without the necessity for first preparing a positive original from that negative by substituting a photographic material of the direct positive type.

For developing the exposed light-sensitive silver halide emulsion layer, in principle, any non-tanning developing solution may be used. Also, the exposed and developed emulsion layer may be fixed before the softening treatment is performed although this step is not essential.

In order to soften the gelatin in the developed areas the photographic material may be treated with a solution of suitable composition for softening the high density development areas where the silver halide has been developed to a silver image. Thus, this softening treatment may be carried out by immersing the developed photographic material in an aqueous peroxide solution containing an acid and, where desirable, a catalyst. The treatment of developed silver halide layers with such solutions for other purposes, e.g., for the production of wash- and relief- and/or reflex copies, is well known and the preparation of various solutions meeting the requirements of the invention is within the skill of the art.

According to a preferred embodiment of the present invention, the developed emulsion layer is immersed for a short period of time in an aqueous peroxide solution containing acetic acid and a copper salt.

After exposure, development, and treatment with the solution for softening the gelatin in the high density development areas, the emulsion layer of the photographic material is pressed into contact for a short period of time with the dyestuff material, e.g., by squeezing the materials between a pair of rubber rollers, after which the two materials are separated. The carbon paper or other dyestuff material may be discarded and the photographic material is now ready for use as a duplicating master. By virtue of having been brought into contact with the dyestuff layer of the carbon, the unsoftened regions of the emulsion layer of the photographic materials acquires a coating of the dyestuff which coating renders the photographic layer capable of serving as the master for duplication purposes.

*Example*

A contrasty silver chloride (negative type) emulsion is coated onto a paper sheet at the rate of 80 g./sq.m., gelled and dried. The document to be reproduced is placed with its text bearing face into surface contact with the emulsion side of the so prepared photographic material and the rear side of the photographic material is exposed to light, e.g., in an apparatus as used in the production of reflex copies. Thereafter, the photographic material is treated for 1 minute with a developing solution at 20° C. and of the following composition:

| | |
|---|---:|
| Water (40° C.) _____ ml__ | 800 |
| Sodium sulphite (anhydr.) _____ g__ | 25 |
| Hydroquinone _____ g__ | 6 |
| Sodium carbonate (cryst.) _____ g__ | 100 |
| Potassium bromide _____ g__ | 1 | and subsequently for 12 seconds with a solution of the following composition:

| | |
|---|---:|
| Acetic acid _____ g__ | 50 |
| Cupric chloride _____ g__ | 10 |
| Hydrogen peroxide 25% aqueous solution ____ ml__ | 100 |
| Water to 900 ml. | |

Then the photographic material is passed together with a duplicating carbon paper between a pair of rubber rollers, the photographic emulsion layer being in contact with the carbon layer. As already indicated, the carbon paper is of the type generally used in the preparation of duplicating master sheets for spirit duplicating by mechanical means, e.g., by type-writing, except that the dyestuff layer is devoid of any protective supercoat. The two sheets are then separated, the unsoftened regions of the emulsion layer acquiring a superstratum of dyestuff from the dyestuff layer and the dyestuff layer of superstratum of softened emulsion in the corresponding regions from the emulsion layer in the process, and the carbon paper is discarded. The photographic material can be used as a master for making tens of positive prints in one of the commercially available automatic or semi-automatic spirit duplicators.

The selection and/or design of apparatus suitable for carrying out the manipulative operations of the method herein contemplated should be apparent to one skilled in the art from what has already been said. However, if guidance in this regard is necessary, reference may be had to the previously identified application wherein a variety of forms of apparatus is suggested.

What I claim is:

1. A process of photographically preparing a spirit duplicating master, adapted to produce direct reading copies of a direct reading original to be copied in a spirit duplicating process, by the steps comprising:
   (1) photographically exposing to the original to be copied a silver halide emulsion layer to produce in the exposed areas of said area a latent photographic image of said original, said image being negative to said original;
   (2) developing said emulsion layer with a non-tanning developing solution to form in said exposed areas a developed silver image of said original;
   (3) treating said emulsion layer with a peroxide-containing aqueous solution to soften said developed areas of said layer, the unexposed areas thereof being maintained unsoftened;
   (4) pressing the emulsion layer with the softened and unsoftened areas intact thereon and in substantially coplanar relationship, into direct contact with a hectographic dyestuff-containing layer of a hectographic dye sheet, said layer being free of protective coating, to transfer a portion of the softened, developed portion of said layer to said dye-containing layer and a portion of the dye-containing layer to the unexposed, unsoftened areas of said emulsion layer; and
   (5) separating the sheet and emulsion layer with the transferred portions respectively retained thereon whereby said sheet and emulsion layer are selectively adapted to serve as said spirit duplicating master.

2. A method according to claim 1 including the further step of discarding the dyestuff layer and retaining the emulsion layer as the printing master.

3. A method according to claim 1 wherein the silver halide emulsion is one which by imagewise exposure and development gives a silver image in the exposed areas.

4. A method according to claim 1 wherein the emulsion layer is softened by treatment with a composition comprising an aqueous peroxide solution containing an acid and a catalyst.

5. A method according to claim 4 wherein the composition comprises an aqueous peroxide solution containing acetic acid and a copper salt.

6. The process of claim 1 wherein said original bears indicia on an opaque support and said photographic exposure (step 1) is carried out reflectographically.

7. The method of claim 1 wherein said exposure step is carried out to produce a laterally reversed negative image of said original to be copied.

References Cited in the file of this patent
UNITED STATES PATENTS

| | | |
|---|---|---|
| 2,058,396 | Baker | Oct. 27, 1936 |
| 2,596,754 | Yackel | May 13, 1952 |
| 2,852,371 | Kendall | Sept. 16, 1958 |
| 2,903,964 | Taylor | Sept. 15, 1959 |

FOREIGN PATENTS

| | | |
|---|---|---|
| 715,961 | Great Britain | Sept. 22, 1954 |